United States Patent
Kim

(10) Patent No.: US 8,331,718 B2
(45) Date of Patent: Dec. 11, 2012

(54) METHOD OF REVISING EDGES OF IMAGE

(75) Inventor: Kil-Tae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1042 days.

(21) Appl. No.: 12/314,076

(22) Filed: Dec. 3, 2008

(65) Prior Publication Data
US 2010/0040305 A1 Feb. 18, 2010

(30) Foreign Application Priority Data
Aug. 14, 2008 (KR) .................. 10-2008-0080043

(51) Int. Cl.
*G06K 9/40* (2006.01)
(52) U.S. Cl. ..................... 382/266; 382/260
(58) Field of Classification Search ............ 375/240.18, 375/240.29; 382/100, 260, 264, 286
See application file for complete search history.

(56) References Cited

U.S. PATENT DOCUMENTS

| | | | |
|---|---|---|---|
| 2007/0047760 A1* | 3/2007 | Sharma et al. | 382/100 |
| 2007/0223839 A1* | 9/2007 | Kisilev et al. | 382/286 |
| 2008/0170620 A1* | 7/2008 | Zhang | 375/240.18 |
| 2008/0212890 A1* | 9/2008 | Loubachevskaia et al. | 382/260 |
| 2009/0041373 A1* | 2/2009 | Incesu et al. | 382/264 |
| 2011/0129020 A1* | 6/2011 | Li et al. | 375/240.29 |

OTHER PUBLICATIONS

J.-M. Park et al., "Speckle filtering of SAR images based on adaptive windowing", IEE Proc.-Vis. Image Signal Process, vol. 146, No. 4, Aug. 1999, pp. 191-197.

* cited by examiner

*Primary Examiner* — Vu Le
*Assistant Examiner* — Xuemei Chen
(74) *Attorney, Agent, or Firm* — Morgan, Lewis & Bockius LLP

(57) ABSTRACT

A method of revising edges of an image includes sampling a window of a square shape from an input image; classifying the input image into a homogeneous area and a heterogeneous area; determining a maximum window for the homogeneous area and a minimum window for the heterogeneous area; performing a first noise filtering process for the maximum window; determining a minimum variance area from the minimum window; and performing a second noise filtering process for the minimum variance area.

6 Claims, 4 Drawing Sheets

METHOD OF REVISING EDGES OF IMAGE

The present invention claims the benefit of Korean Patent Application No. 10-2008-0080043 filed in Korea on Aug. 14, 2008, which is hereby incorporated by reference.

BACKGROUND OF THE INVENTION

1. Field of the Invention

The invention relates to a method of revising edges of an images in a liquid crystal display (LCD) device, and more particularly, to a method of revising edges of an images of an LCD device being capable of removing a noise in an image and resolving a blurring problem in edges of an image.

2. Discussion of the Related Art

The related art LCD device includes a liquid crystal panel and a backlight unit providing light onto the liquid crystal pixels. The liquid crystal panel includes a plurality of liquid crystal pixels arranged in a matrix shape and a thin film transistor (TFT) on a substrate. The TFT controls a supply of image data for adjusting a light transmittance through the liquid crystal pixels by controlling a rotation angle of liquid crystal molecules in the liquid crystal pixel. The LCD device displays a desired gray level by transmitting the light through the liquid crystal panel.

A noise in a digital image is removed to obtain a high quality displaying image. For example, the noise includes a white noise or an impulse noise. The noise is added on digital data when images are generated by the LCD device.

The noise is simply removed by using a low-pass filter (LPF). The noise is almost removed by the LPF. However, there is a blurring problem in edges of an image when the LPF is used.

The LPF for removing the noise in the image, for example, has a filter having a fixed 5*5 pixel size. Since a color information of a high frequency part is distorted in a part having a sudden image change, edges of the image is blurred.

Accordingly, not only removing the noise but also conservation of edges of image is required. To meet these requirements, a method of "Speckle Filtering of SAR Images Based on Adaptive Windowing" is introduced by a first issue of an eleventh volume (pages 719-722) of a collection of learned papers published by "The Institute of Electronics Engineers of Korea" on 1998.

In the Adaptive Windowing method, an image is classified into a homogeneous area, where there is scarcely an image change, and a heterogeneous area, where there are much image change through analyzing the image. A noise filtering process is performed with a filter having a large size in the homogeneous area. For example, the filter having a 9*9 image window size is enlarged into an 11*11 or 13*13 window size. On the other hand, a noise filtering process is performed with a filter having a smaller size in the heterogeneous area to remove a noise in the image and prevent a blurring problem in edges of the image. For example, the filter having a 9*9 image window size is reduced into a 7*7 or 5*5 window size.

Unfortunately, even if the image is filtered with a noise filter having the minimized window size by the Adaptive Windowing method, there is still a blurring problem in the heterogeneous area.

SUMMARY OF THE INVENTION

Accordingly, embodiments of the invention are directed to a method of revising edges of an images that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method of revising edges of an image includes sampling a widow of a square shape from an input image; classifying the input image into a homogeneous area and a heterogeneous area; determining a maximum window for the homogeneous area and a minimum window for the heterogeneous area; performing a first noise filtering process for the maximum window; determining a minimum variance area from the minimum window; and performing a second noise filtering process for the minimum variance area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

The present invention is suggested to meet requirements of removing a noise in an image and preventing a blurring problem in edges of an image. A method of revising edges of an image may be a mixed type of an Adaptive windowing method and a variance intersection method. Namely, in the present invention, a blurring problem in edges of an image in a heterogeneous area is overcome by the variance intersection method.

Figure 1:
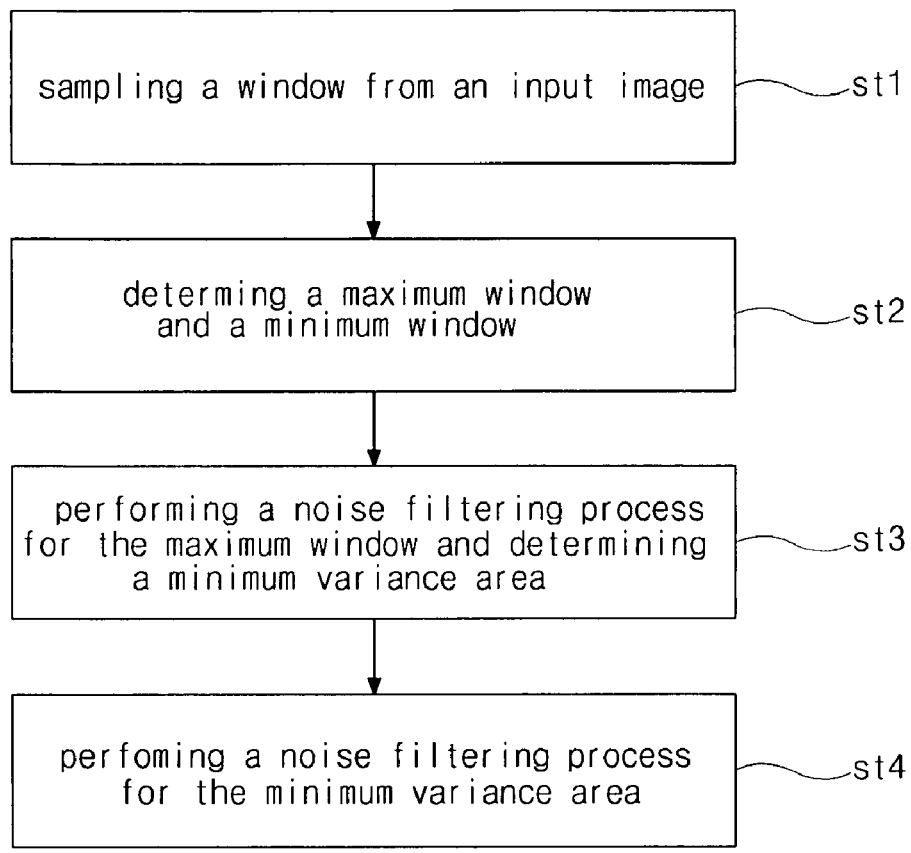
FIG. 1 is a schematic block diagram illustrating a method of revising edges of an image according to an embodiment of the present invention.
Figure 2:
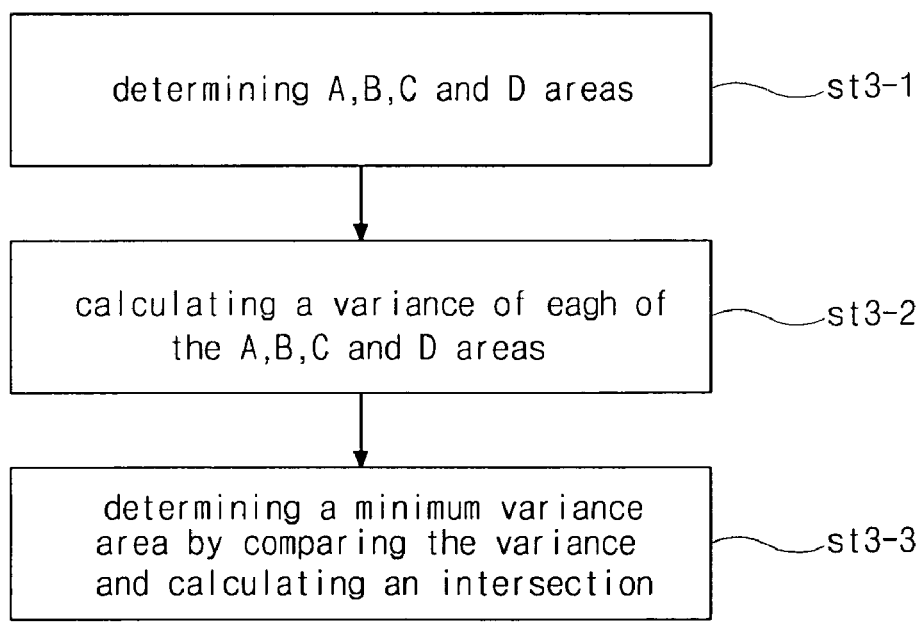
FIG. 2 is a schematic block diagram illustrating a method of revising edges of an image according to an embodiment of the present invention.

FIGS. 1 and 2 are schematic block diagrams illustrating a method of revising edges of an image according to an embodiment of the present invention, respectively.

Referring to FIG. 1, in a st1 step, a window having a predetermined size is sampled from an input image to revise edges of the image by the Adaptive Windowing method. The sampled window has a perfect square shape. For example, the sampled window has a 9*9 pixel size. The size of the sampled window can be various depending on requirements.

Next, the image of the sampled window is classified into a homogeneous area, where there is scarcely an image change, and a heterogeneous area, where there are much image change through analyzing the image. Since there is scarcely an image change in the homogeneous area, a maximum window is selected for filtering a noise in the homogeneous area by enlarging the size of the window. Since there are much image changes in the heterogeneous area, a minimum window is selected for filtering a noise in the heterogeneous area by reducing the size of the window. (st2)

In this case, the classification of the sampled window into the homogeneous area and the heterogeneous area and the selection of the maximum window and the minimum window refer to the above-mentioned method of "Speckle Filtering of SAR Images Based on Adaptive Windowing".

Next, a noise filtering process is performed on the maximum window in the homogeneous area by the Adaptive Windowing method. In addition, a minimum variance area is determined for the minimum window in the heterogeneous area. (st3)

Namely, the Adaptive Windowing method is applied to the first to third steps "st1" to "st3", while a variance intersection type method is performed on the minimum window in the heterogeneous area for edges of the image.

Referring to FIG. 2, the variance intersection type method is explained.

The minimum variance area is defined as a region of the minimum window selected from the heterogeneous region where a noise filtering process is performed. The minimum variance area is a portion having a relatively smaller variance based on a center pixel of the minimum window.

Figure 3:
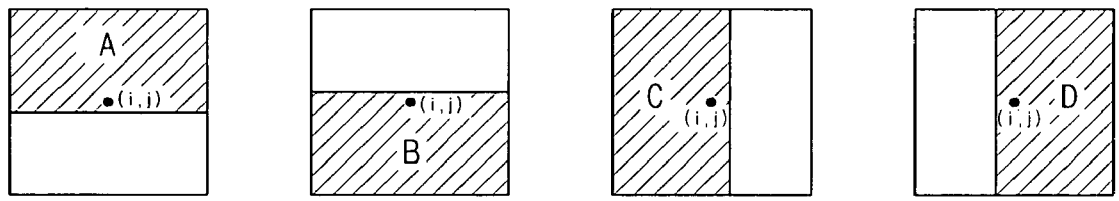
FIG. 3 is a schematic view illustrating a method of determining an upper side area "A", a lower side area "B", a left side area "C" and a right side area "D", respectively, in a minimum widow by a variance intersection type image edges revising method according to the present invention.

Referring to FIG. 3, a center pixel (i,j), an upper side area "A", a lower side area "B", a left side area "C" and a right side area "D" are determined. (st3-1) The determining method of the upper side area "A", the lower side area "B", the left side area "C" and the right side area "D" are various. For example, in the minimum window of a 5*5 pixel size, the upper side area "A" may be a region including first to third horizontal pixel rows from an uppermost portion to a lower portion, and the left side area "C" may be a region including first to third horizontal pixel rows from a most left portion to a lower portion.

Next, a first variance $(\sigma_A)^2$ of a pixel gray level in the upper side area "A", a second variance $(\sigma_B)^2$ of a pixel gray in the lower side area "B", a third variance $(\sigma_C)^2$ of a pixel gray level in the left side area "C" and a fourth variance $(\sigma_D)^2$ of a pixel gray level in the right side area "D" are calculated. (st3-2) Then, the minimum variance area is determined by calculating an intersection of a comparison between the first variance $(\sigma_A)^2$ and the second variance $(94_B)^2$ and a comparison between the third variance $(\sigma_C)^2$ and the fourth variance $(\sigma_D)^2$. (st3-3)

Namely, one having a smaller variance among the upper side area "A" and the lower side area "B" and another one having a smaller variance among the left side area "C" and the right side area "D" are selected, and then an intersection of the selected one and another one is selected. By these processes, the minimum variance area is determined.

Figure 4:
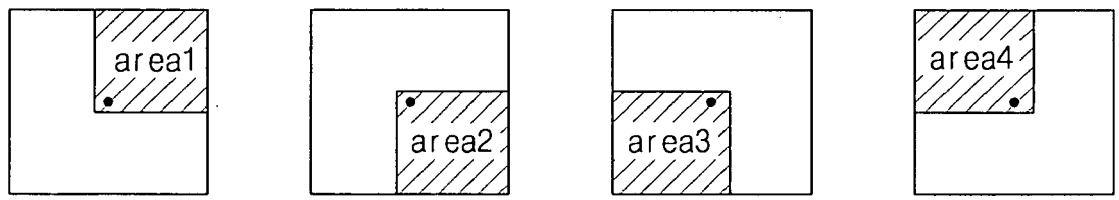
FIG. 4 is a schematic view illustrating a method of determining a first minimum variance area "area1" to a fourth minimum variance area "area4", respectively, in a minimized widow by a variance intersection type image edges revising method according to the present invention.

Referring to FIG. 4, the minimum variance area corresponds to one of four areas "area1", "area2", "area3" and "area4". The four areas "area1", "area2", "area3" and "area4" are referred to as a first minimum variance area "area1", a second minimum variance area "area2", a third minimum variance area "area3" and a fourth minimum variance area "area4". The first minimum variance area "area1" is determined when $\{(\sigma_A)^2 \leq (\sigma_B)^2\} \cap \{(\sigma_C)^2 > (\theta_D)^2\}$. The second minimum variance area "area2" is determined when $\{(\sigma_A)^2 > (\sigma_B)^2\} \cap \{(\sigma_C)^2 > (\sigma_D)^2\}$. The third minimum variance area "area3" is determined when $\{(\sigma_A)^2 > (\sigma_B)^2\} \cap \{(\sigma_C)^2 \leq (\sigma_D)^2\}$. The fourth minimum variance area "area4" is determined when $\{(\sigma_A)^2 \leq (\sigma_B)^2\} \cap \{(\sigma_C)^2 \leq (\sigma_D)^2\}$.

Namely, the first minimum variance area "area1" corresponds to a intersection area between the upper side area "A" having a smaller variance than the lower side area "B" and the right side area "D" having a smaller variance than the left side area "C". The second minimum variance area "area2" corresponds to a intersection area between the lower side area "B" having a smaller variance than the upper side area "A" and the right side area "D" having a smaller variance than the left side area "C". The third minimum variance area "area3" corresponds to a intersection area between the lower side area "B" having a smaller variance than the upper side area "A" and the left side area "C" having a smaller variance than the right side area "D". The fourth minimum variance area "area4" corresponds to a intersection area between the upper side area "A" having a smaller variance than the lower side area "B" and the left side area "C" having a smaller variance than the right side area "D".

A size of each of the first to fourth minimum variance areas "area1", "area2", "area3" and "area4" is various depending on a size of the minimum window. For example, they may have a size above a 5*5 pixel size considering an operation condition, for example, an operating time.

Figure 5A:
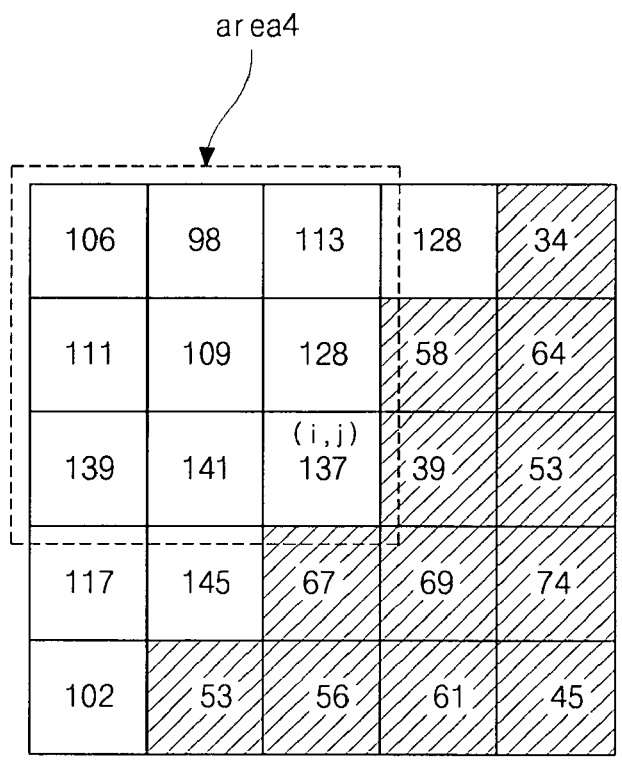
FIGS. 5A and 5B are schematic views illustrating a minimum variance area in a 5*5 minimum window sampled from a heterogeneous area according to a method of revising edges of an image according to the present invention.
Figure 5B:
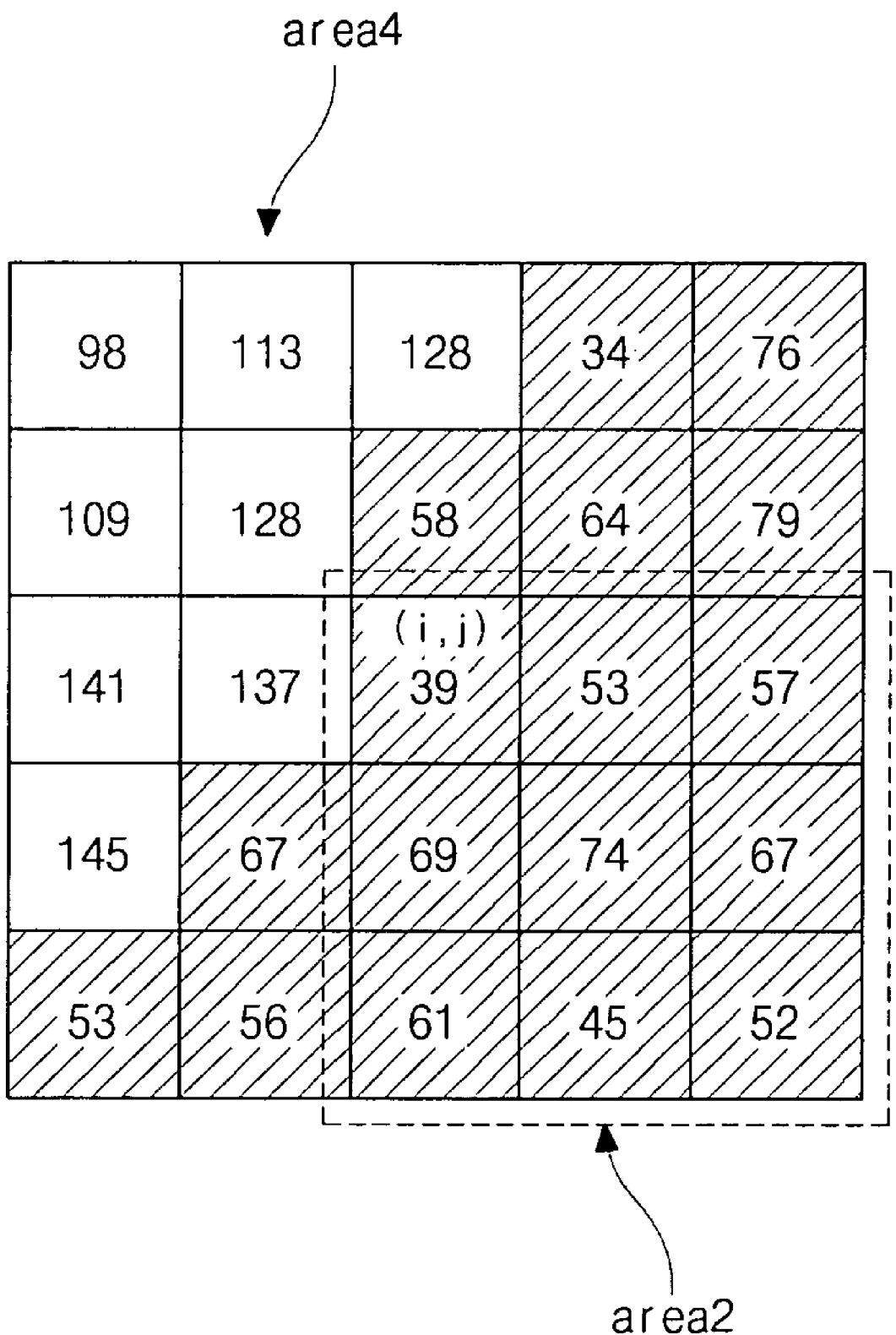

FIGS. 5A and 5B are schematic views illustrating a minimum variance area in a 5*5 minimum window sampled from a heterogeneous area according to a method of revising edges of an image according to the present invention. In FIGS. 5A and 5B, a gray level in each pixel is different from each other depending on an image change. FIG. 5A shows a fourth minimum variance area "area4" having a 3*3 pixel size, and FIG. 5B shows a second minimum variance area "area2" having a 3*3 pixel size.

Referring again to FIG. 1, a noise filtering process is performed for a minimum variance area, which corresponds to one of the first to fourth minimum variance areas "area1" to "area4", determined by the variance intersection method. (st4) For example, the noise filtering process uses a low-pass filter (LPF).

Figure 6:
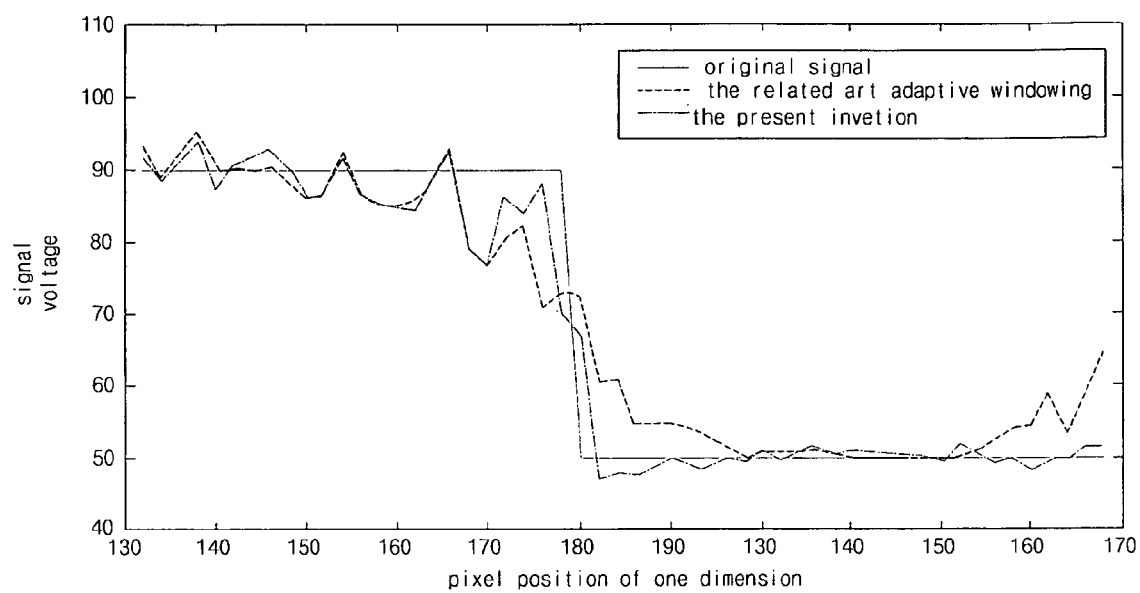
FIG. 6 is a graph illustrating an image quality after a filtering process according to the related art and the present invention.

FIG. 6 is a graph illustrating an image quality after a filtering process according to the related art and the present invention. FIG. 6 shows three signal lines. One is an original signal applied into one pixel of the minimum window in the heterogeneous area. Another one is an image signal by the related art adaptive windowing method. The other one is an image signal by a method of revising edges of an image according to the present invention.

In FIG. 6, the original signal is considered as an ideal state. Considered with the original signal, the image signal by a method of revising edges of an image according to the present invention is closer to the ideal state than the image signal by the related art adaptive windowing method. Accordingly, when the image is revised by the present invention, a displaying image has a high quality.

In the method of revising edges of the image according to the present invention, a noise filtering process is performed for a minimum variance area of a minimum window of a heterogeneous area. Accordingly, there is no blurring problem in edges of an image. At the same time, a noise in an image is efficiently removed such that a high quality displaying image can be obtained.

It will be apparent to those skilled in the art that various modifications and variations can be made in the exemplary embodiments of the present invention without departing from the spirit or scope of the invention. Thus, it is intended that the invention cover the modifications and variations of this invention provided they come within the scope of the appended claims and their equivalents.

What is claimed is:

1. A method of revising edges of an image, comprising:
    sampling a window of a square shape from an input image;
    classifying the input image into a homogeneous area and a heterogeneous area;
    determining a maximum window for the homogeneous area and a minimum window for the heterogeneous area;
    performing a first noise filtering process for the homogeneous area;
    determining an area estimated to have a minimum variance among a plurality of areas of the heterogeneous area corresponding to the minimum window; and
    performing a second noise filtering process for the area estimated to have the minimum variance, wherein the second noise filtering is not performed for the other areas among the plurality of areas of the heterogeneous area corresponding to the minimum window, wherein the step of determining the area estimated to have the minimum variance includes:
    determining first to fourth areas from the minimum window, the first to fourth areas corresponding to an upper side area, a lower side area, a left side area and a right side area with respect to a center pixel of the minimum window, respectively;
    calculating first to fourth variances of the first to fourth areas; and
    calculating an intersection of a comparison between the first variance and the second variance and a comparison between the third variance and the fourth variance to determine a minimum variance area,
    wherein the first to fourth variances correspond to $(\sigma_A)^2$, $(\sigma_B)^2$, $(\sigma_C)^2$, and $(\sigma_D)^2$ respectively.

2. The method according to claim 1, wherein the area estimated to have the minimum variance is determined by one of (a) to (d) equations:
    (a) the minimum variance area=an intersection of the first and fourth areas, when $(\sigma_A)^2 \leq (\sigma_B)^2$ and $(\sigma_C)^2 > (\sigma_D)^2$,
    (b) the minimum variance area=an intersection of the second and fourth areas, when $(\sigma_A)^2 > (\sigma_B)^2$ and $(\sigma_C)^2 > (\sigma_D)^2$,
    (c) the minimum variance area=an intersection of the second and third areas, when $(\sigma_A)^2 > (\sigma_B)^2$ and $(\sigma_C)^2 \leq (\sigma_D)^2$ and
    (d) the minimum variance area=an intersection of the first and third areas, when $(\sigma_A)^2 \leq (\sigma_B)^2$ and $(\sigma_C)^2 \leq (\sigma_D)^2$.

3. The method according to claim 2, wherein the window has a 9*9pixel size, and the area estimated to have the minimum variance has a 5*5 pixel size in minimum.

4. The method according to claim 1, wherein the first to fourth variances are a variance of a gray level of a pixel in a respective area.

5. The method according to claim 1, wherein each of the first to second noise filtering processes uses a low-pass filter.

6. The method according to claim 1, wherein the step of determining the maximum window from the homogeneous area and the minimum window from the heterogeneous area is performed by an adaptive windowing method.

* * * * *